US011147246B2

(12) United States Patent
Haney et al.

(10) Patent No.: US 11,147,246 B2
(45) Date of Patent: Oct. 19, 2021

(54) HUMMINGBIRD FEEDER WITH IMPROVED FLOWER ASSEMBLY MOUNTING MEMBER

(71) Applicant: WOODSTREAM CORPORATION, Lititz, PA (US)

(72) Inventors: Luke Benjamin Haney, Lititz, PA (US); Steven Charles Lorraine, Glastonbury, CT (US)

(73) Assignee: Woodstream Corporation, Lancaster, PA (US)

( * ) Notice: Subject to any disclaimer, the term of this patent is extended or adjusted under 35 U.S.C. 154(b) by 221 days.

(21) Appl. No.: 16/380,527

(22) Filed: Apr. 10, 2019

(65) Prior Publication Data

US 2019/0320622 A1    Oct. 24, 2019

Related U.S. Application Data

(60) Provisional application No. 62/659,893, filed on Apr. 19, 2018.

(51) Int. Cl.
*A01K 39/02*    (2006.01)

(52) U.S. Cl.
CPC ............................... *A01K 39/0206* (2013.01)

(58) Field of Classification Search
CPC ..................... A01K 39/0206; A01K 39/0213
See application file for complete search history.

(56) References Cited

U.S. PATENT DOCUMENTS

| | | | | |
|---|---|---|---|---|
| 3,125,069 A * | 3/1964 | Fowler | ................... | A01K 39/00 119/77 |
| 3,913,527 A * | 10/1975 | Kilham | ................ | A01K 39/014 119/74 |
| 4,691,665 A * | 9/1987 | Hefner | ................ | A01K 39/012 119/57.8 |
| 7,861,671 B2 * | 1/2011 | Carter | ................ | A01K 39/0206 119/72 |
| 8,763,556 B1 | 7/2014 | Vaughn, Jr. | | |
| 9,179,650 B2 * | 11/2015 | Gauker | ................... | A01K 39/02 |
| 9,474,253 B2 * | 10/2016 | Coughlin | ........... | A01K 39/0206 |
| 10,342,220 B2 * | 7/2019 | Haney | ...................... | A01K 39/04 |
| 2007/0272161 A1 * | 11/2007 | Stone | ................... | A01K 39/012 119/51.01 |
| 2007/0289540 A1 * | 12/2007 | Stone | ................. | A01K 39/0206 119/72 |
| 2011/0297095 A1 * | 12/2011 | Cruz | .................... | A01K 39/012 119/80 |
| 2014/0158056 A1 * | 6/2014 | Vaughn, Jr. | ......... | A01K 39/0206 119/72 |
| 2019/0320620 A1 * | 10/2019 | Lubic | ................. | A01K 39/0206 |
| 2019/0320621 A1 * | 10/2019 | Lubic | ................. | A01K 39/0206 |

* cited by examiner

*Primary Examiner* — Kristen C Hayes
(74) *Attorney, Agent, or Firm* — Barley Snyder (57) ABSTRACT

A hummingbird feeder is provided that includes a nectar container removably coupled to a feeding basin having at least one feed port therein and a flower assembly fitted within the feed port. The flower assembly includes a flower body and a mounting member fitted in the center of the flower body, the mounting member having an elongated tapered passageway through which hummingbirds can access nectar in the feeding basin. The mounting member also has a semi-conical exterior geometry that facilitates mounting of the flower assembly within the feed port.

20 Claims, 11 Drawing Sheets

HUMMINGBIRD FEEDER WITH IMPROVED FLOWER ASSEMBLY MOUNTING MEMBER

This application claims priority from U.S. provisional application Ser. No. 62/659,893, filed Apr. 19, 2018.

BACKGROUND OF THE INVENTION

Field of the Invention

The present invention is related to the field of hummingbird feeders and, more particularly, to a hummingbird feeder having an improved flower assembly mounting member.

Description of the Related Art

Hummingbird feeders include a nectar basin having feed ports through which hummingbirds access nectar held in the basin. The feed ports may simply be small openings in the cover or upper surface of the basin through which the hummingbird inserts its beak. However, in many hummingbird feeder designs, the openings in the basin cover are larger and are made to receive artificial flower assemblies. Each flower assembly typically includes a flower body made to resemble the petals of a real flower and a center part that attaches the assembly to the basin cover. The center part, or center plug, which is sized to fill the opening in the basin cover, typically has a central opening therein through which the hummingbirds can access nectar. A flower assembly having a center part is disclosed in U.S. Pat. No. 8,763,556 ("the '556 patent") which is co-owned by the assignee of the instant invention. The complete disclosure of the '556 patent is hereby incorporated by reference herein as if set forth in its entirety.

Hummingbird feeders having flower assemblies often also provide access to unwanted visitors, such as bees, wasps and the like. If the center part or center plug is made longer and/or narrower to prevent bee access, hummingbirds may have difficulty aligning their long beaks within the center opening. Further, disassembly and reassembly of the feeder for cleaning can be complicated by the configuration of the center plugs. Therefore, a need exists for a hummingbird feeder having an improved flower assembly mounting member that addresses these potential difficulties.

SUMMARY OF THE INVENTION

In view of the foregoing, the present invention is directed to a hummingbird feeder that includes a feeding basin removably coupled to a nectar container. The feeding basin has a plurality of feed port holes and a respective plurality of flower assemblies that fit within the feed port holes. Each flower assembly includes a flower body and a mounting member, which functions as the center part or center plug, that fits within the center of the flower body and engages with the feed port hole to secure the flower assembly to the feeding basin. The mounting member has an elongated tapered nectar passageway that provides improved hummingbird access while making it more difficult for bees and other insects to access the nectar in the basin through the mounting member. The mounting member also has a semi-conical outer geometry that facilitates insertion of the mounting member into the feeding basin port hole.

Accordingly, it is an object of the present invention to provide a hummingbird feeder that includes a feeding basin with feeder ports and at least one flower assembly having an improved mounting member with an elongated tapered nectar passageway therein that provides improved hummingbird access to nectar in the feeding basin while making it more difficult for bees and other insects to access the nectar through the passageway.

Another object of the present invention is to provide a hummingbird feeder in accordance with the preceding object in which the mounting member has a semi-conical exterior geometry that facilitates insertion of the mounting member into a corresponding feeder port.

A further object of the present invention is to provide a hummingbird feeder in accordance with the preceding objects in which the flower assemblies are easier to secure to the feeding basin, providing an improved user experience when disassembling and assembling the feeder for cleaning.

Another object of the present invention is to provide a hummingbird feeder with at least one flower assembly or flower body having a nectar access passageway that diminishes in size from an outer end through which the hummingbird's beak first enters the flower to an inner end proximal the nectar, the diminishing size of the passageway preventing bees from entering the nectar basin while allowing long-beaked hummingbirds to readily obtain nectar.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
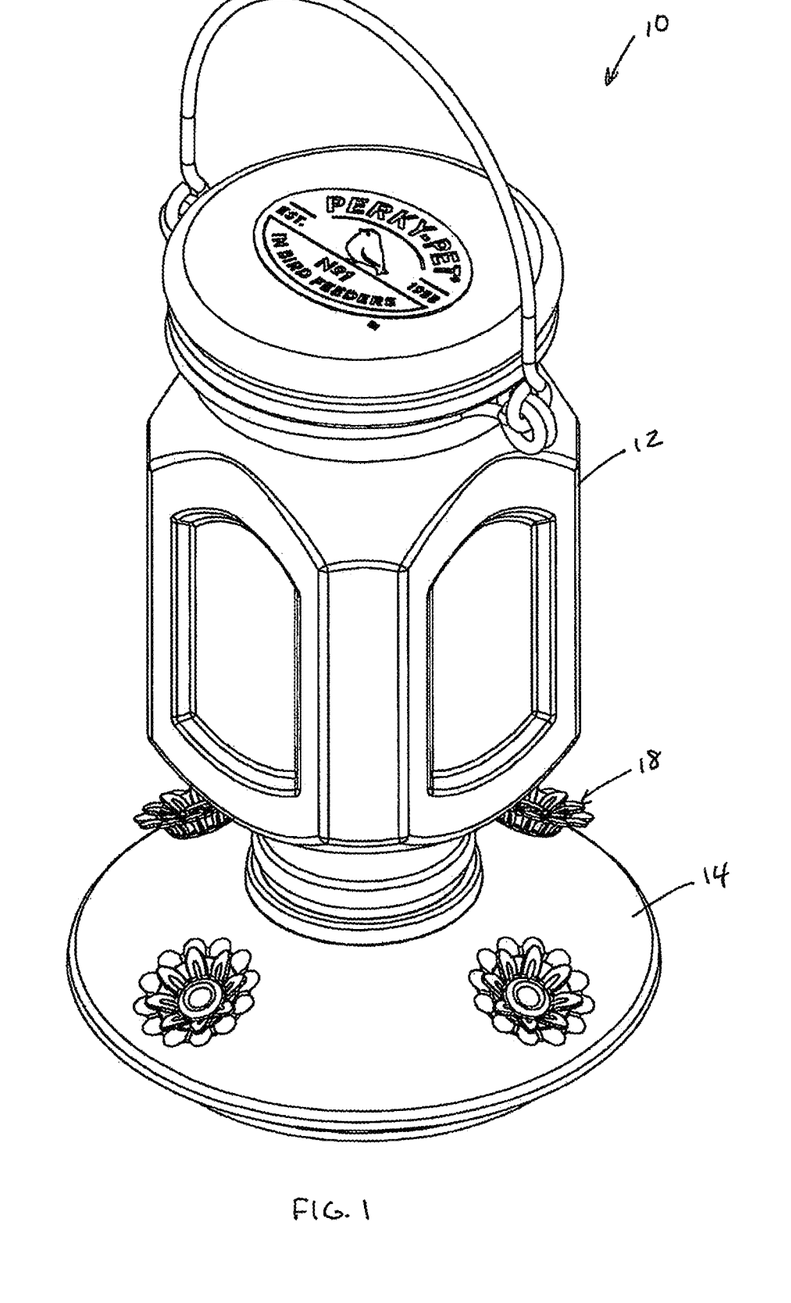
FIG. 1 is a perspective view of a hummingbird feeder in accordance with the present invention.
Figure 2:
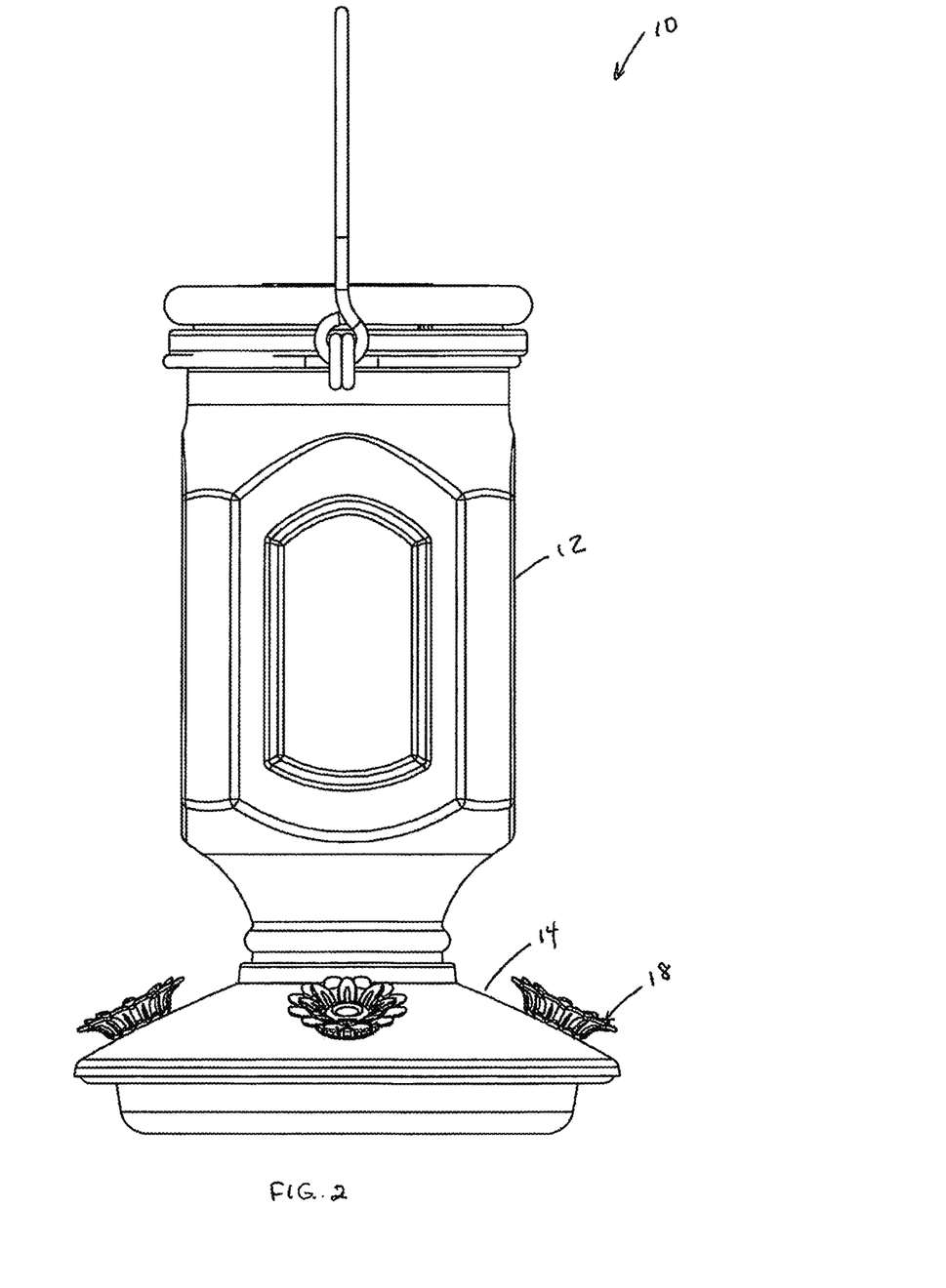
FIG. 2 is a side view of the hummingbird feeder shown in FIG. 1.
Figure 3:
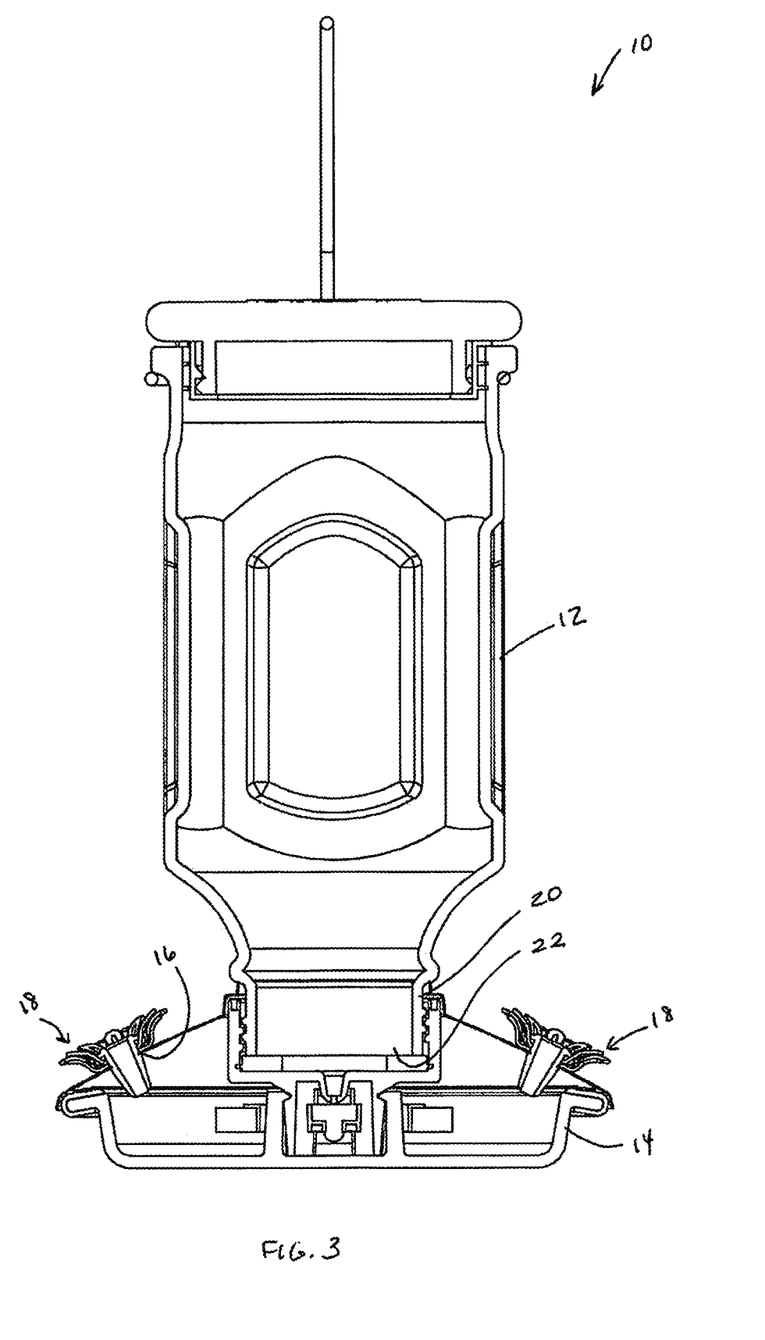
FIG. 3 is a cutaway side view of the hummingbird feeder shown in FIG. 2.

As shown in FIGS. 1-3, the present invention is directed to a hummingbird feeder generally designated by reference numeral 10. The feeder includes a nectar container 12 and a feeding basin 14 having at least one feed port 16 (see FIG. 3) that is fitted with a removable flower assembly generally designated by reference numeral 18.

As shown in FIG. 3, the nectar container 12 includes a lower end 20 with a bottom opening 22. The feeding basin 14 is removably coupled the lower end 20 of the nectar container 12 and is in liquid flow communication with the bottom opening 22. Nectar held in the container flows into the feeding basin 14 through the bottom opening 22 and is accessed by hummingbirds through the feed ports 16 in the basin 14 in the manner known by persons of skill in the art.

Figure 4:
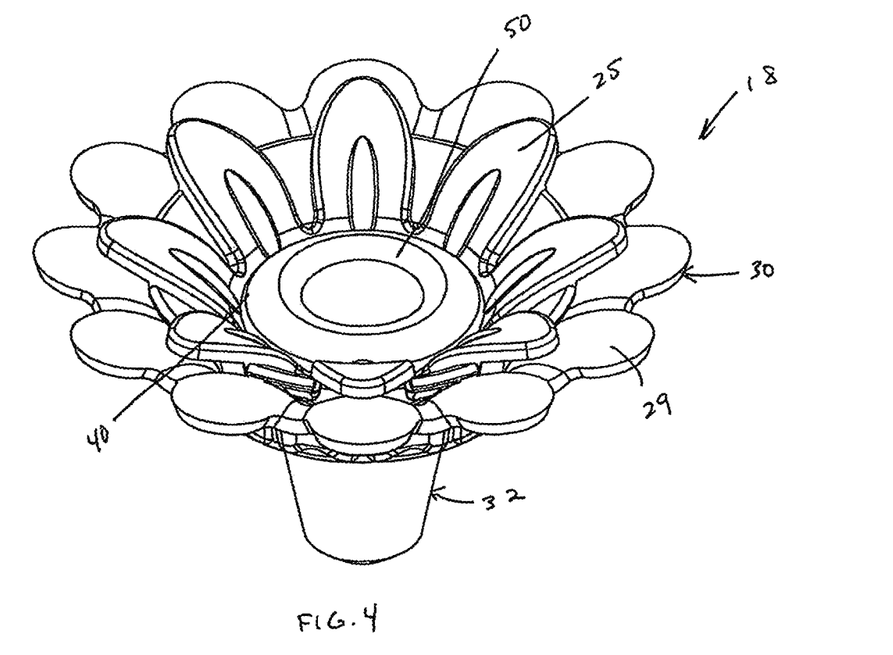
FIG. 4 is an isolated perspective view of an assembled flower assembly like those shown mounted to the feeder in FIG. 1.
Figure 5:
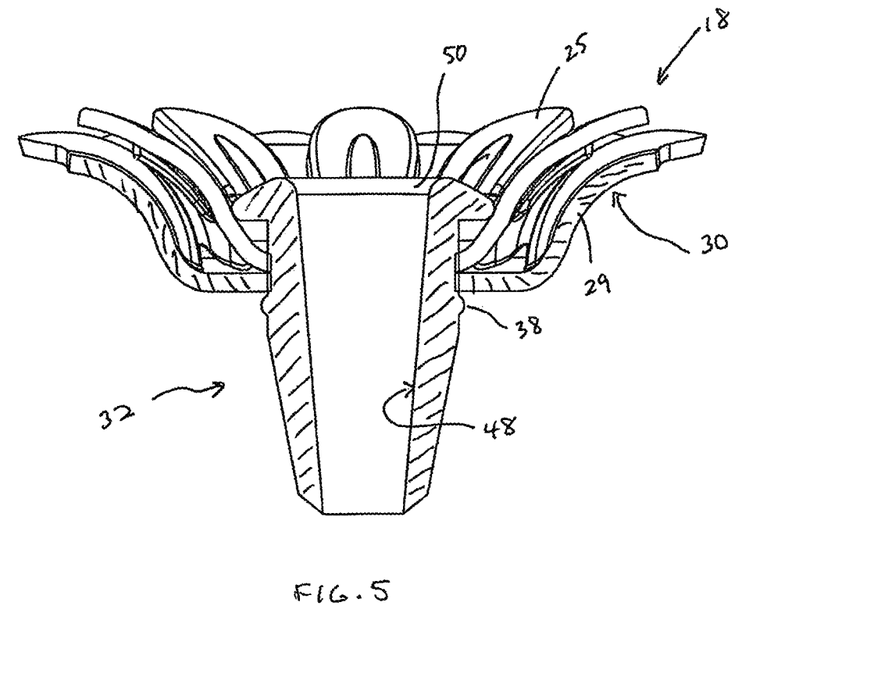
FIG. 5 is a side cutaway view of the assembled flower assembly shown in FIG. 4.
Figure 6:
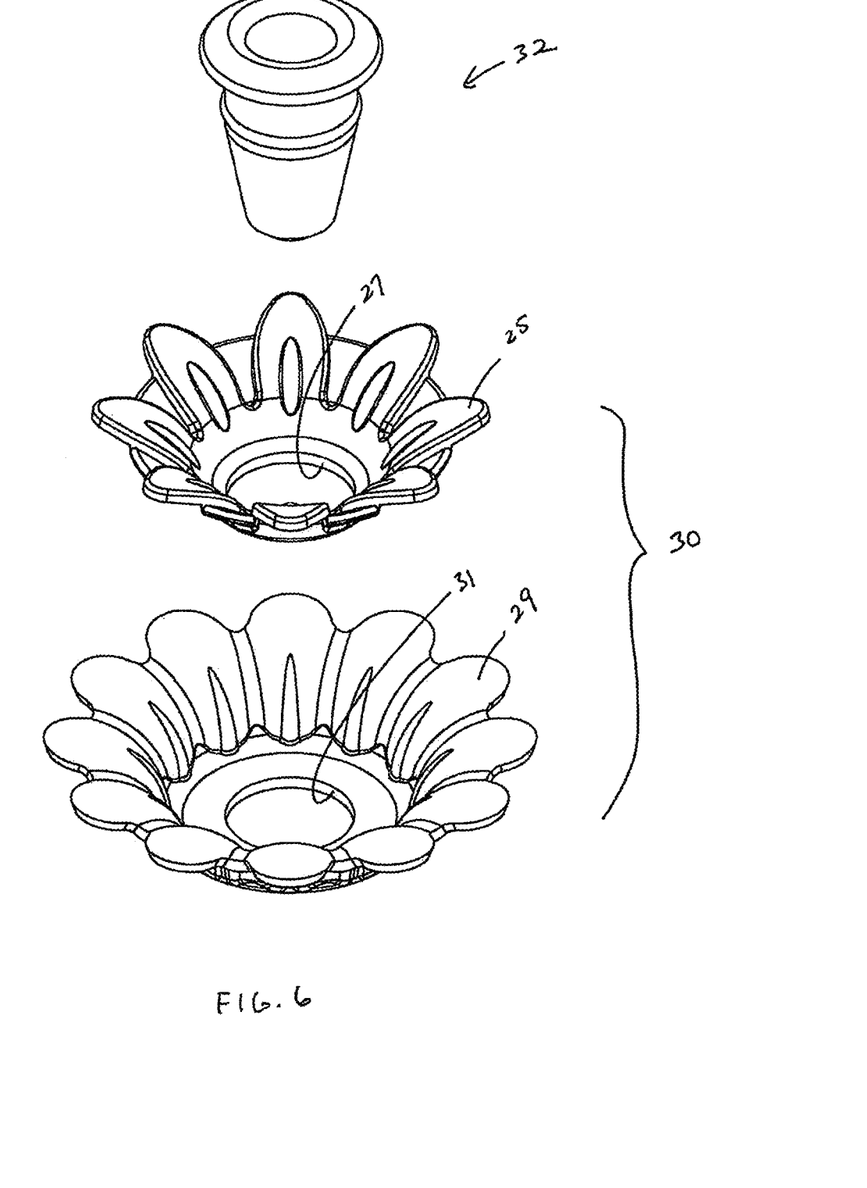
FIG. 6 is an exploded view of the components of the flower assembly shown in FIG. 4.
Figure 8:
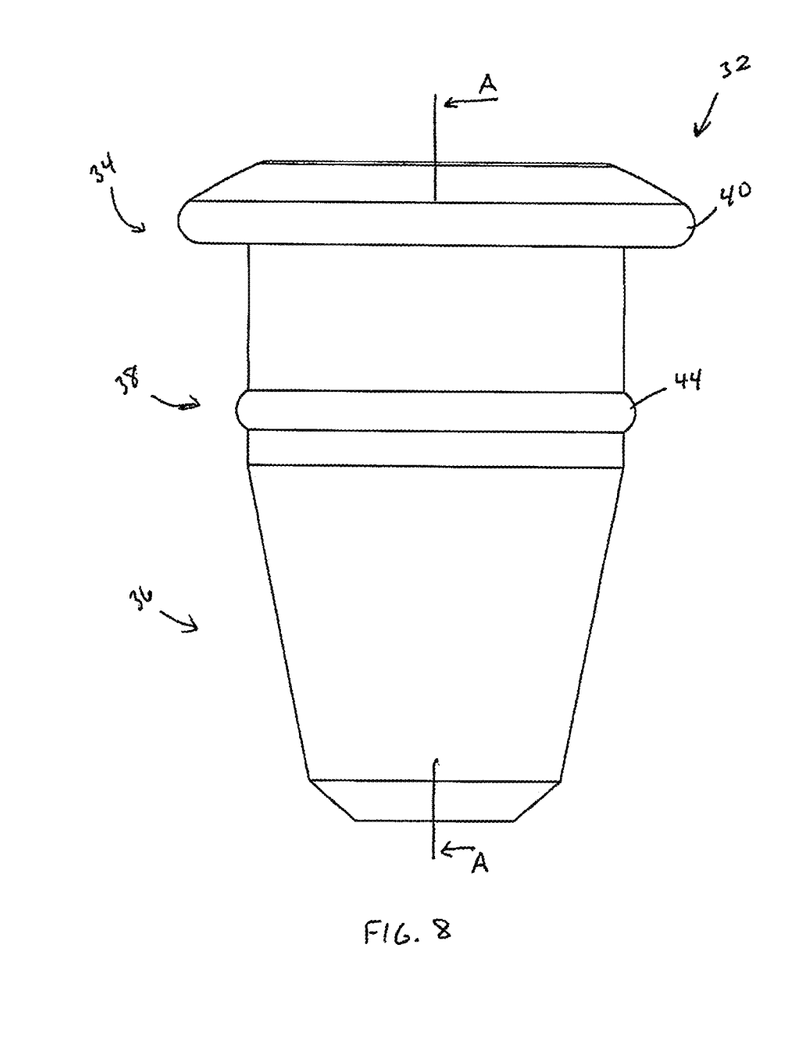
FIG. 8 is a side view of the mounting member shown in FIG. 6.

As shown in isolation in FIGS. 4-6, the flower assembly 18 includes an artificial flower body generally designated by reference numeral 30 and a mounting member generally designated by reference numeral 32. As can be best seen in FIGS. 8 and 8A, the mounting member includes an upper or outer part generally designated by reference numeral 34, a lower or insertion part generally designated by reference numeral 36, and a stop element generally designated by reference numeral 38.

In the embodiment shown in FIGS. 4-6, the flower body 30 includes a first petal ring 25 having a central opening 27 and a second petal ring 29 having a central opening 31. When the flower assembly 18 is assembled as best seen in FIG. 5, the first petal ring 25 is partially nested on top of the second petal ring and the mounting member 32 is inserted through the aligned central openings 27, 31 of the flower body 30. Having two petal rings 25, 29 enhances the realistic appearance of the flower body 30. However, the mounting member 32 according to the present invention may be used with flower bodies having only a single petal ring as well as on feeders that do not include any petal rings or flower bodies.

Figure 7:
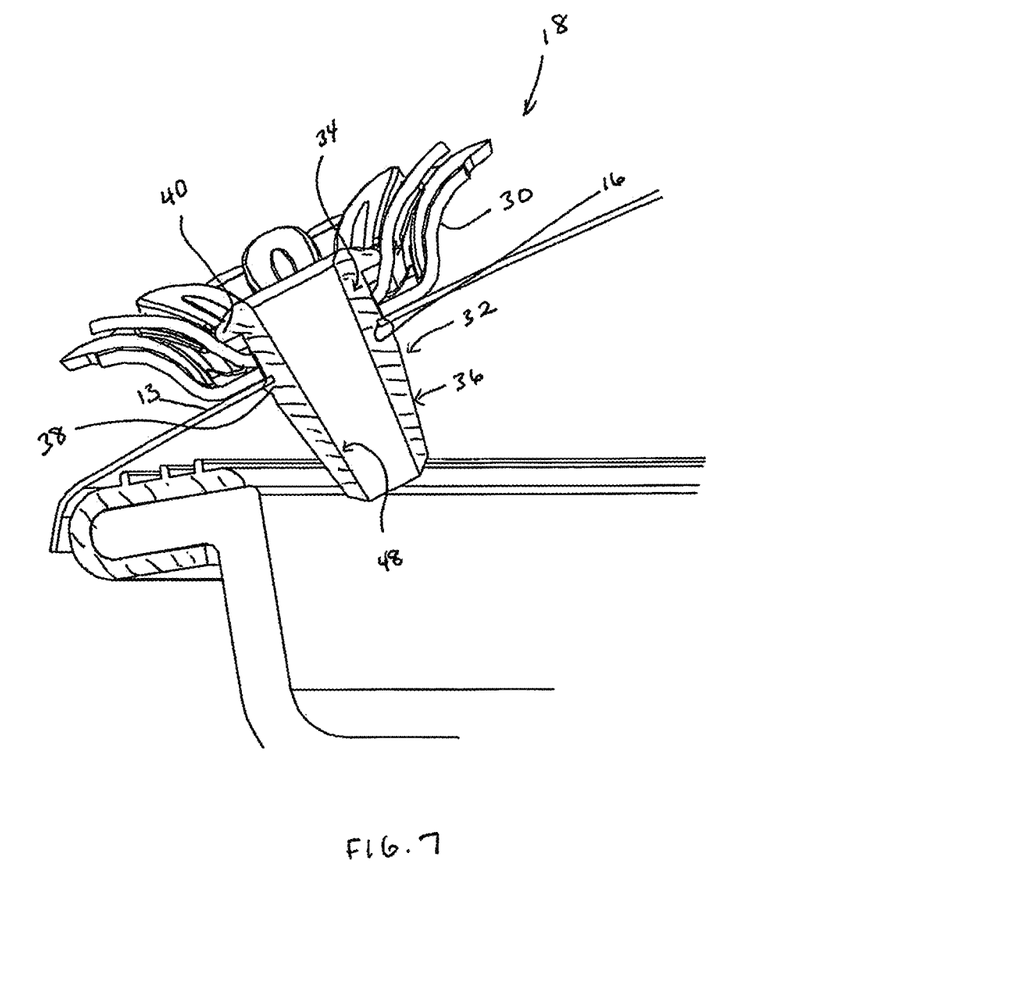
FIG. 7 is a cross sectional view of the flower assembly shown in FIG. 4 as mounted within a feed port of the feeding basin of the hummingbird feeder shown in FIG. 1.

When the flower assembly 18 is secured to the basin 14 as shown in FIG. 7, the insertion part 36 of the mounting member 32 extends through the aligned petal ring openings 27, 31 of the flower body and is secured within the feed port 16 of the basin 14. The flower body 30 is captured between the upper surface 13 of the basin and a rim 40 on the outermost end 50 of the upper part 34 of the mounting member 32. The stop element 38, which may have various configurations, engages with the edge of the basin feed port 16 to secure the mounting member in the feed port 16.

In the embodiments shown, the stop element 38 includes a flexible ridge or protruding ring 44 around the outer circumference of the mounting member 32. The outer circumference of the ring 44 is greater than the inner diameter of the feeding basin port 16 so that, when the mounting member 32 is inserted into the basin feed port and pressed, the ring 44 flexes to pass through the port and then snaps back out to secure the flower assembly 18 within the basin port 16 with a snap fit.

Figure 8A:
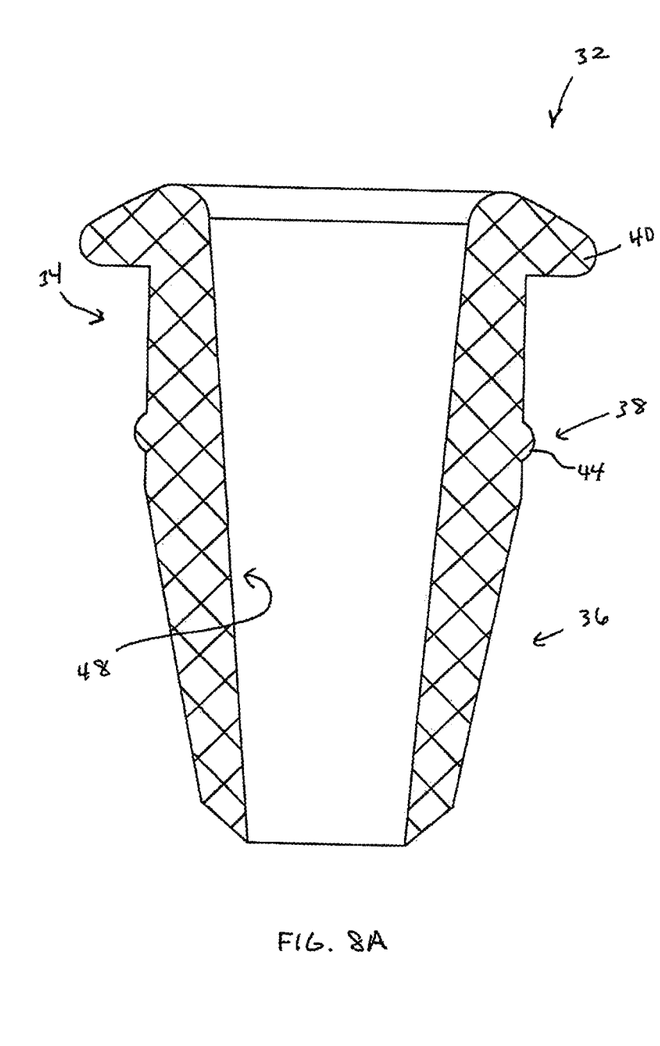
FIG. 8A is a cross sectional view of the mounting member shown in FIG. 8.

According to the first embodiment of the present invention, the mounting member 32 has an elongated nectar passageway generally designated by reference numeral 48 that tapers down from the upper part 34 to the lower part 36 of the mounting member 32 as shown in FIGS. 5, 7 and 8A. It has been found that a gradual narrowing of the passageway 48, as by a specified conical tapering, can prevent access to the nectar by bees, wasps and the like, while not impeding access to nectar by hummingbirds.

More specifically, in preferred embodiments, the elongated passageway 48 is generally between about 0.5 inches and about 0.75 inches in length, and preferably is about 0.625 inches. However, depending upon the species of hummingbird, the tapered passageway may be up to about 2.5 inches in length.

The inner diameter of the passageway tapers from a diameter of about 0.30 inches adjacent the outer end 50 of the upper part 34 to a diameter of about 0.10 inches adjacent the bottom end 52 of the lower part 36, with a preferred outer end diameter of about 0.25 inches and a preferred bottom or inner end diameter of about 0.125 inches. The angle of taper, as measured from the central axis of the taper to the inner surface of the passageway 48, is between about 3 degrees and about 7 degrees, with a preferred taper being about 4.5 degrees. As used herein, it will be understood that "about" is intended to include size dimensions that are within a quarter inch of the stated values for length and for angle of taper values that are within 0.5 to 1.0 degrees of the stated values.

While the conical inner taper like that shown in FIGS. 5, 7 and 8A is preferred, the elongated nectar access passageway according to the present invention may have other configurations some of which are represented by the second embodiment of a mounting member 132 shown in FIGS. 9 and 9A-9D, the third embodiment of a mounting member 232 shown in FIGS. 10 and 10A-10D, and the fourth embodiment of a mounting member 332 shown in FIGS. 11 and 11A-11D.

Figure 9:
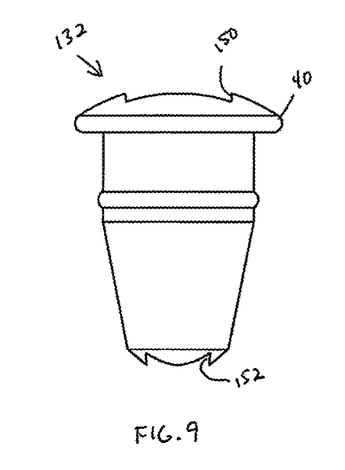
FIG. 9 is a side view of a second embodiment of a mounting member in accordance with the present invention.
Figure 9A:
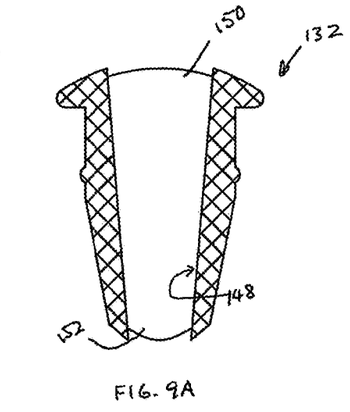
FIG. 9A is a side cutaway view of the mounting member shown in FIG. 9.
Figure 9B:
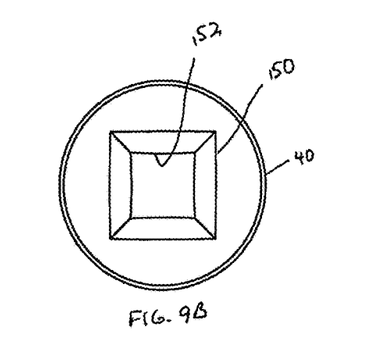
FIG. 9B is a top view of the mounting member shown in FIG. 9.
Figure 9C:
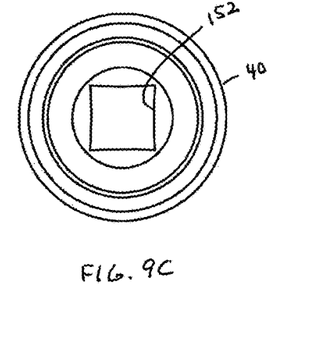
FIG. 9C is a bottom view of the mounting member shown in FIG. 9.
Figure 9D:
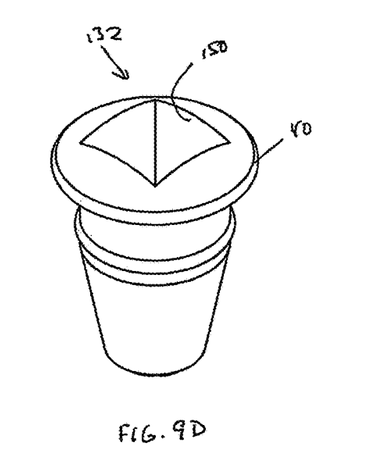
FIG. 9D is a perspective view of the mounting member shown in FIG. 9.
Figure 10:
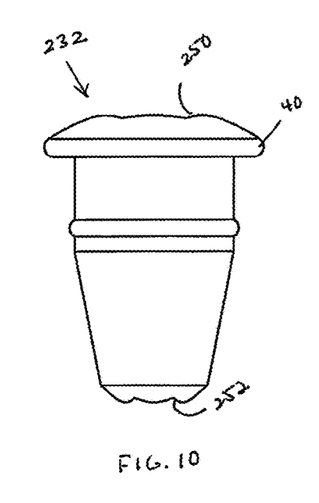
FIG. 10 is a side view of a third embodiment of a mounting member in accordance with the present invention.
Figure 10A:
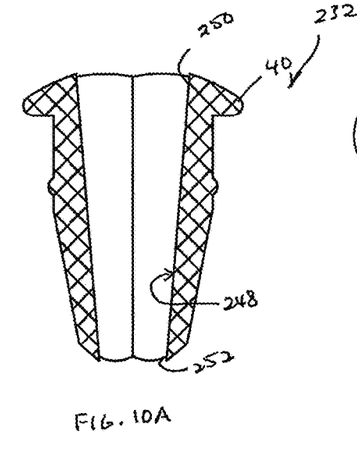
FIG. 10A is a side cutaway view of the mounting member shown in FIG. 10.
Figure 10B:
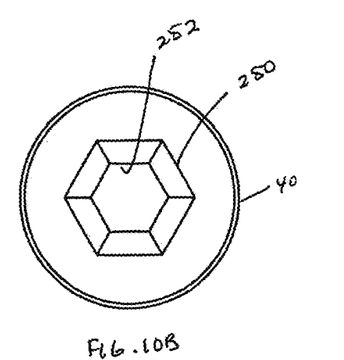
FIG. 10B is a top view of the mounting member shown in FIG. 10.
Figure 10C:
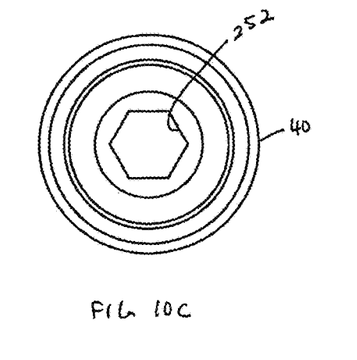
FIG. 10C is a bottom view of the mounting member shown in FIG. 10.
Figure 10D:
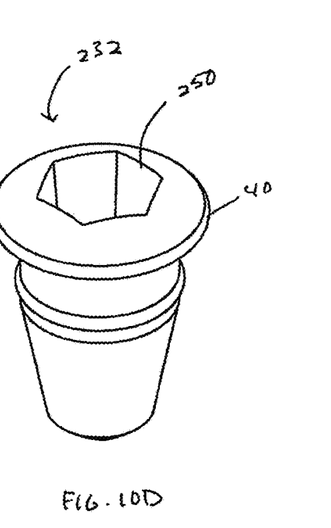
FIG. 10D is a perspective view of the mounting member shown in FIG. 10.
Figure 11:
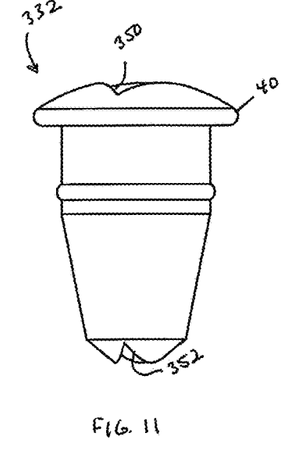
FIG. 11 is a side view of a fourth embodiment of a mounting member in accordance with the present invention.
Figure 11A:
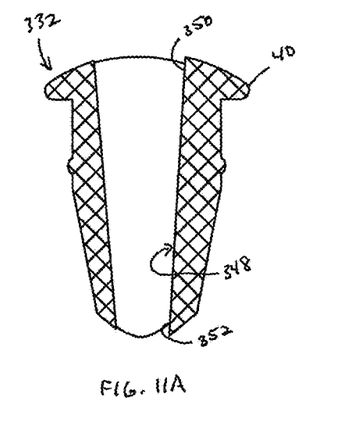
FIG. 11A is a side cutaway view of the mounting member shown in FIG. 11.
Figure 11B:
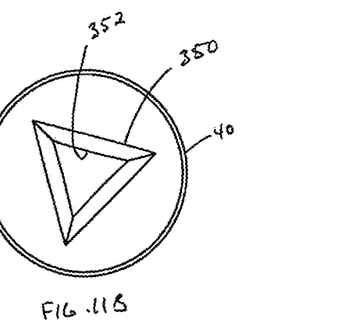
FIG. 11B is a top view of the mounting member shown in FIG. 11.
Figure 11C:
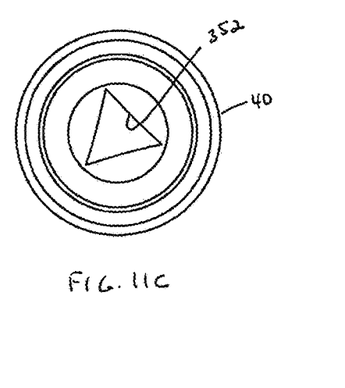
FIG. 11C is a bottom view of the mounting member shown in FIG. 11.
Figure 11D:
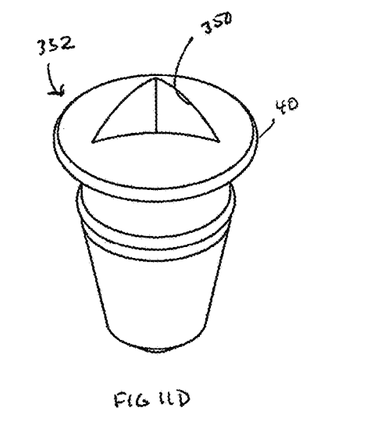
FIG. 11D is a perspective view of the mounting member shown in FIG. 11.

As shown, the mounting member 132 includes an elongated tapered passageway 148 having four sides that taper from an outer end opening 150 to an inner end opening 152. Hence, the passageway is substantially square in cross section as shown in FIGS. 9B and 9C. The mounting member 232 includes an elongated tapered passageway 248 having six sides that taper from an outer end opening 250 to an inner end opening 252, giving the passageway a substantially hexagonal cross section as shown in FIGS. 10B and 10C. The mounting member 332 includes an elongated tapered passageway 348 having three sides that taper from an outer end opening 350 to an inner end opening 352 so that the passageway has a substantially triangular cross section as shown in FIGS. 11B and 11C. The taper may also be non-regular having, for example, a trumpet-flared opening at the outer end (not shown). With respect to the mounting members 132, 232 and 332, the sizes of the outer end opening and the inner end opening are measured across the widest point and fall within the same ranges already provided in connection with the diameter of the elongated passageway 48 of semi-conical shape (see FIGS. 5, 7 and 8A). Length and taper angle parameters are likewise the same as those already disclosed herein.

As used herein, it will be understood that "substantially"—as in "substantially square", "substantially hexagonal", and "substantially triangular"—is intended to include shapes that visibly resemble square, hexagonal and triangular shapes, respectively, even if such shapes have rounded corners, curvature to the sides or other variations that may not result in a structure that is technically or perfectly square, hexagonal, triangular, and the like, as other shapes are also intended to be included within the scope of the instant invention.

Figure 12:
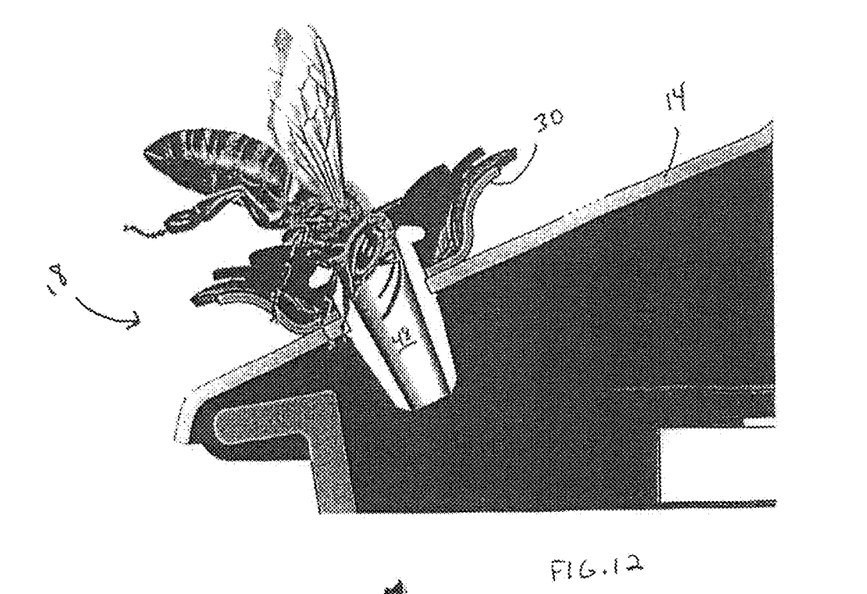
FIG. 12 is a partial cross sectional view of one flower assembly mounted in a feed port like that shown in FIG. 7 with a bee attempting to access nectar through the passageway in the mounting member.
Figure 13:
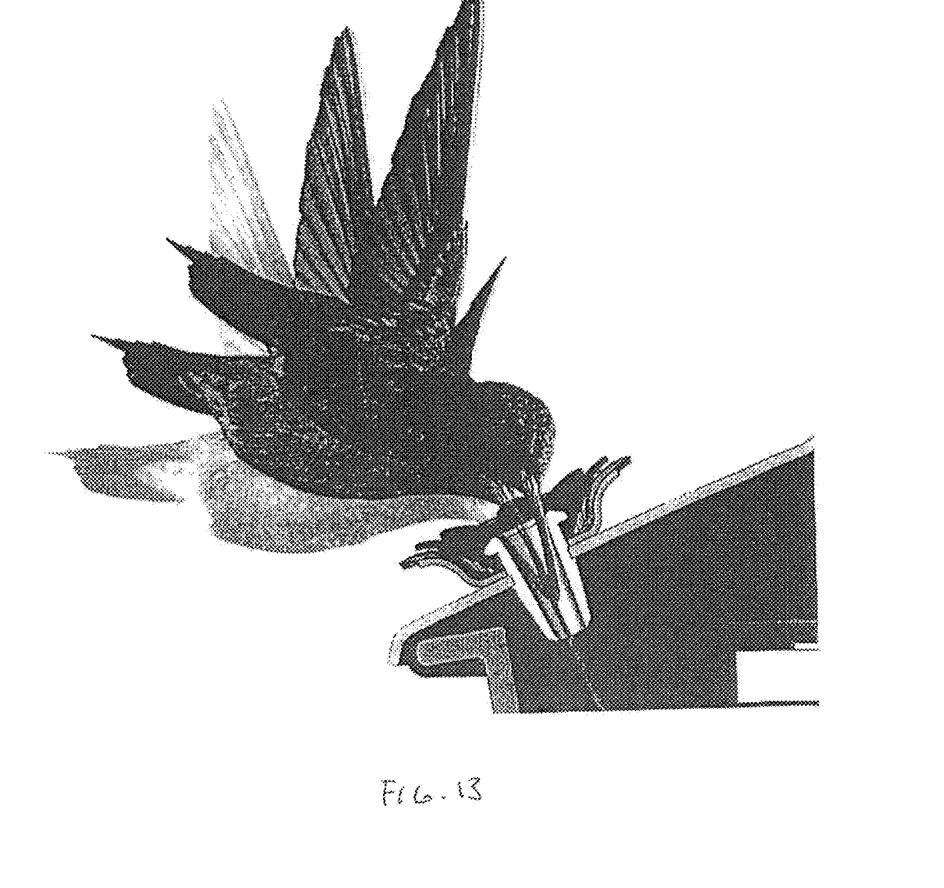
FIG. 13 shows the cross sectional view as in FIG. 12 but with a long-beaked hummingbird that is able to easily access nectar by pivoting within the tapered passageway in the mounting member.

Regardless of the particular inner contour that is employed to achieve the taper of from about 0.30 inches adjacent the rim 40, as measured across the diameter or the widest point, to about 0.10 inches at the bottom of the mounting member, again as measured across the diameter or the widest point, the elongated tapered nectar passageway 48, 148, 248, 348 makes it more difficult for bees, wasps, and the like, to access nectar as the length and diminishing size of the passageway blocks ingress (see FIG. 12). At the same time, the length of the passageway does not present an obstacle for hummingbirds since the taper, with its wider opening adjacent the rim 40 of the upper part 34, provides room for the birds to pivot as shown in FIG. 13.

The outer geometry of the lower or insertion part 36 of the mounting member 32 according to the embodiments disclosed herein is preferably semi-conical. The semi-conical exterior geometry facilitates insertion of the mounting member into a corresponding feeder port, making it easier for the user to mount the flower assemblies. However, the exterior geometry could have other shapes provided the feed port holes are configured with complementary openings. As one example, the outer surface of the lower or insertion part 36 could be triangular in cross section, similar to the passageway of mounting member 332 but on the exterior, and preferably tapered, to facilitate mounting of the plug member 332 to a feeding basin having triangular feed ports (not shown), and so on. A mounting member having a tapered exterior with a shape that corresponds with the shape of the feed port openings, regardless of the specific shape, results in an improved user experience when disassembling and assembling the feeder for cleaning.

While the embodiments of the mounting member described herein have a stop member by which the mounting member is engaged within the feeding basin port with a snap fit, the present invention is not intended to be limited to this manner of removably securing the flower assembly to the feeding basin. Rather, other connecting mechanisms may also be used, such as threaded connectors, friction fit elements, and the like, without departing from the scope of the present invention. Therefore, the present invention is directed to a mounting member or center plug to be secured within a feeding basin port, generally in combination with an artificial flower although the mounting member or plug could be used without ornamentation, the mounting member or center plug having an elongated tapered passageway that deters bees and other insects while providing hummingbirds with nectar access as shown and described herein, and all equivalents thereof.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A hummingbird feeder comprising:
   a nectar container having a lower end with a bottom opening;
   a feeding basin removably coupled to the lower end of the nectar container and in liquid flow communication with said bottom opening, said feeding basin having at least one feed port opening therein; and
   a flower assembly including an artificial flower body and a mounting member fitted within an opening in the flower body to secure the flower assembly to the at least one feed port, the mounting member having an elongated tapered passageway between about 0.5 inches and about 0.75 inches in length through which hummingbirds access nectar in the feeding basin.

2. The hummingbird feeder as set forth in claim 1, wherein the elongated tapered passageway has a semi-conical shape.

3. The hummingbird feeder as set forth in claim 2, wherein the mounting member has a semi-conical exterior geometry.

4. The hummingbird feeder as set forth in claim 1, wherein the passageway tapers from an outer opening of about 0.30 inches adjacent an upper rim of the mounting member to a bottom opening of about 0.10 inches at an opposite end positioned inside the feeding basin.

5. The hummingbird feeder as set forth in claim 4, wherein the elongated tapered passageway has a semi-conical shape.

6. The hummingbird feeder as set forth in claim 4, wherein the elongated tapered passageway is substantially square in cross section.

7. The hummingbird feeder as set forth in claim 4, wherein the elongated tapered passageway is substantially hexagonal in cross section.

8. The hummingbird feeder as set forth in claim 4, wherein the elongated tapered passageway is substantially triangular in cross section.

9. The hummingbird feeder as set forth in claim 4, wherein an inner surface of the elongated passageway has an angle of taper between about 3 degrees and about 7 degrees with respect to a central axis of the taper.

10. The hummingbird feeder as set forth in claim 1, wherein the passageway tapers from an outer opening of about 0.25 inches adjacent an upper rim of the mounting member to a bottom opening of about 0.125 inches at an opposite end positioned inside the feeding basin.

11. A hummingbird feeder comprising:
 a nectar container having a lower end with a bottom opening;
 a feeding basin removably coupled to the lower end of the nectar container and in liquid flow communication with said bottom opening, said feeding basin having at least one feed port opening therein; and
 a plug fitted within the at least one feed port and having an elongated tapered passageway through which hummingbirds access nectar in the feeding basin, the elongated tapered passageway having an inner surface with an angle of taper between about 3 degrees and about 7 degrees with respect to a central axis of the taper.

12. The hummingbird feeder as set forth in claim 11, further comprising a flower body having a center opening, the plug fitting within the center opening and securing the flower body to the at least one feed port.

13. The hummingbird feeder as set forth in claim 12, wherein the flower body includes a first petal ring and a second petal ring, the center opening being formed by alignment of central openings in each of the first and second petal rings through which the plug is fitted.

14. The hummingbird feeder as set forth in claim 11, wherein the elongated tapered passageway has a semi-conical shape.

15. The hummingbird feeder as set forth in claim 11, wherein the elongated tapered passageway is between about 0.5 inches and about 0.75 inches in length.

16. The hummingbird feeder as set forth in claim 11, wherein the passageway tapers from an outer opening of about 0.30 inches adjacent an upper rim of the plug to a bottom opening of about 0.10 inches at an opposite end positioned inside the feeding basin.

17. The hummingbird feeder as set forth in claim 16, wherein the elongated tapered passageway has a semi-conical shape.

18. The hummingbird feeder as set forth in claim 16, wherein the elongated tapered passageway has a multi-sided cross section.

19. A hummingbird feeder comprising:
 a nectar container having a lower end with a bottom opening;
 a feeding basin removably coupled to the lower end of the nectar container and in liquid flow communication with said bottom opening, said feeding basin having a feed port opening therein;
 a plug fitted within the feed port opening and having an elongated tapered passageway through which hummingbirds access nectar in the feeding basin, the plug defining a rim proximate a first end thereof and a protruding ring defined about its outer circumference having a diameter greater than that of the feed port opening; and
 a flower body having a center opening, the plug inserted through the center opening and the protruding ring inserted through the feed port opening for securing the flower body to the feed basin between the rim of the plug and an outer surface of the basin.

20. The hummingbird feeder as set forth in claim 19, wherein the flower body includes a first petal ring and a second petal ring, each of the first and second pedal rings having a center opening, the plug inserted through the center openings of the first and second pedal rings for securing each of the first and second pedal rings between the rim of the plug and an outer upper surface of the basin.

* * * * *

(12) EX PARTE REEXAMINATION CERTIFICATE (12758th)

United States Patent
Haney et al.

(10) Number: US 11,147,246 C1
(45) Certificate Issued: Oct. 25, 2024

(54) HUMMINGBIRD FEEDER WITH IMPROVED FLOWER ASSEMBLY MOUNTING MEMBER

(71) Applicant: WOODSTREAM CORPORATION, Lititz, PA (US)

(72) Inventors: Luke Benjamin Haney, Lititz, PA (US); Steven Charles Lorraine, Glastonbury, CT (US)

(73) Assignee: WOODSTREAM CORPORATION, Lititz, PA (US)

Reexamination Request:
No. 90/015,297, Sep. 8, 2023

Reexamination Certificate for:
Patent No.: 11,147,246
Issued: Oct. 19, 2021
Appl. No.: 16/380,527
Filed: Apr. 10, 2019

Related U.S. Application Data

(60) Provisional application No. 62/659,893, filed on Apr. 19, 2018.

(51) Int. Cl.
*A01K 39/02* (2006.01)

(52) U.S. Cl.
CPC .................. *A01K 39/0206* (2013.01)

(58) Field of Classification Search
None
See application file for complete search history.

(56) References Cited

To view the complete listing of prior art documents cited during the proceeding for Reexamination Control Number 90/015,297, please refer to the USPTO's Patent Electronic System.

*Primary Examiner* — Patricia L Engle (57) ABSTRACT

A hummingbird feeder is provided that includes a nectar container removably coupled to a feeding basin having at least one feed port therein and a flower assembly fitted within the feed port. The flower assembly includes a flower body and a mounting member fitted in the center of the flower body, the mounting member having an elongated tapered passageway through which hummingbirds can access nectar in the feeding basin. The mounting member also has a semi-conical exterior geometry that facilitates mounting of the flower assembly within the feed port.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 11 and 19 are determined to be patentable as amended.

Claims 2-5, 9, 10, 12 and 14-17, dependent on an amended claim, are determined to be patentable.

Claims 6-8, 13, 18 and 20 were not reexamined.

1. A hummingbird feeder comprising:
a nectar container having a lower end with a bottom opening;
a feeding basin removably coupled to the lower end of the nectar container and in liquid flow communication with said bottom opening, said feeding basin having at least one feed port opening therein; and
a flower assembly including an artificial flower body and a *separable* mounting member fitted within an opening in the flower body to secure the flower assembly[to], *the mounting member having at least one annular rib configured to directly engage an edge of* the at least one feed port, the mounting member having an elongated tapered passageway *between about 0.5 inches and about 0.75 inches in length* through which hummingbirds access nectar in the feeding basin.

11. A hummingbird feeder comprising:
a nectar container having a lower end with a bottom opening;
a feeding basin removably coupled to the lower end of the nectar container and in liquid flow communication with said bottom opening, said feeding basin having at least one feed port opening therein; and
a plug *with a flower body, the plug having a protruding flexible ring* fitted [within] *through and directly secured against* the at least one feed port, *with no portion of the flower body entering the feed port opening,* and having an elongated tapered passageway through which hummingbirds access nectar in the feeding basin, the elongated tapered passageway having an inner surface with an angle of taper between about 3 degrees and about 7 degrees with respect to a central axis of the taper.

19. A hummingbird feeder comprising:
a nectar container having a lower end with a bottom opening;
a feeding basin removably coupled to the lower end of the nectar container and in liquid flow communication with said bottom opening, said feeding basin having a feed port opening therein;
a plug fitted within the feed port opening and having an elongated tapered passageway through which hummingbirds access nectar in the feeding basin, the plug defining a rim proximate a first end thereof and a protruding *flexible* ring defined about its outer circumference having a diameter greater than that of the feed port opening; and
a flower body having a center opening, the plug inserted through the center opening and the protruding *flexible* ring *being flexed while* inserted through the feed port opening *to directly engage the feed port opening with a snap fit* for securing the flower body to the feed basin between the rim of the plug and an outer surface of the basin, *with no portion of the flower body entering the feed port opening.*

* * * * *